Patented Mar. 22, 1932

1,850,673

UNITED STATES PATENT OFFICE

HENRY C. HOWARD, OF AKRON, OHIO, ASSIGNOR TO AMERICAN ANODE, INC., OF AKRON, OHIO, A CORPORATION OF DELAWARE

METHOD OF TREATING LATEX

No Drawing.   Application filed March 8, 1929.   Serial No. 345,613.

This invention relates to the art of manufacturing rubber, and particularly to the preparation of rubber latex for manufacturing operations in which it is employed.

Rubber latex as it is obtained from the rubber tree is very sensitive to traces of acid and usually coagulates spontaneously within 24 or 48 hours. Latex which is to be shipped and used in the liquid state is therefore customarily preserved by the addition of considerable quantities of an alkali, usually ammonia. However, the free ammonia or other alkali, usually present to the extent of from 1% to 3% or more of the weight of the liquid, is objectionable in most of the manufacturing operations in which the latex is subsequently used. The pungent odor of the ammonia vapors from the latex is irritating and objectionable to the workmen who handle the liquid. The high alkalinity and accompanying high conductivity of strongly alkaline latex introduces numerous difficulties in the manufacture of rubber articles from latex by electrodeposition; the current efficiency is reduced, and the production of smooth and uniform deposits is rendered difficult. In the manufacture of rubber articles by the chemical coagulation of latex, a high alkalinity likewise introduces difficulties; the amount of coagulant which must be employed is considerably increased and comparatively large proportions of salts are formed in the coagulated deposits. It is therefore desirable to reduce the alkalinity of latex prior to its employment in manufacturing operations.

This invention, in brief, consists in treating alkaline latex or a similar aqueous emulsion or dispersion with an adsorbent agent such as silica gel, activated carbon, activated aluminum oxide, etc. The adsorbent quickly reduces the alkalinity of the latex, probably by adsorption of the hydroxyl ions. It is known that different adsorptive agents have different adsorbent powers for specific substances, usually adsorbing most rapidly and completely substances of the same general chemical constitution as the adsorbent agent, or substances capable of chemical reaction therewith. Silica gel, which is a partially hydrated oxide, adsorbs alkali, which is also a hydrated oxide, more readily than does activated carbon, for example. It is also possible that a part of the effect of the silica gel is due to actual chemical reaction of the alkali with the surface of the silica gel, such surface reactions being very closely related to the phenomenon of adsorption. However, it is to be understood that it is not intended to limit this invention by any theories which are advanced herein by way of explanation.

In the practice of this invention the adsorbent agent is preferably of such a particle size as to present a large surface, but the particles should also be large enough to permit of their being readily strained out of the mixture. Particles which are held on a screen with a ½ mm. mesh, but pass through a screen with a 3 mm. mesh, have been found to have a convenient size. The adsorbent should be prepared for use by heating to remove previously adsorbed substances. Heating for an hour at a temperature of about 105° C. is usually sufficient. The prepared adsorbent is stirred into the latex or other dispersion which is to be treated and is allowed to remain in contact therewith, preferably with continued agitation, until the alkalinity is sufficiently reduced. The adsorbent is then strained out of the liquid, washed, dried, and if necessary is ignited, and is ready for further use.

The peculiar efficacy of silica gel is well illustrated by the following experiment. 200 grams of prepared silica gel was stirred into 1 liter of raw ammonia-preserved latex, containing about 38% rubber and about 2% ammonia. The alkalinity was measured by withdrawing samples periodically and determining the pH of the liquid. (A pH value of 7 indicates neutrality, higher values indicating alkalinity, and lower values acidity.)

| Time | pH |
|---|---|
| Before treatment | 11.22 |
| After 30 minutes | 10.70 |
| After 1½ hours | 9.98 |
| After 6½ hours | 9.61 |
| After 24 hours | 9.35 |
| After 7 days | 9.30 |

A similar sample of latex substantially free from ammonia, but containing 0.3% of sodium hydroxide, was treated with silica gel as described above.

| Time | pH |
|---|---|
| Before treatment | 10.90 |
| After 1 hour 20 min | 8.80 |
| After 5½ hours | 8.03 |
| After 22½ hours | 7.90 |

It is evident that silica gel rapidly reduces the alkalinity of alkaline aqueous dispersions such as rubber latex. It has substantially no effect on the other properties of the dispersion, such as the electrical conductivity, the concentration, etc., and does not induce coagulation. Activated carbon, although somewhat less active than the silica gel, has a similar effect upon the alkalinity of aqueous dispersions.

It is to be understood that the term latex, as herein employed, is intended to include natural latices of caoutchouc, gutta-percha, balata, etc., as well as artificial latices or aqueous dispersions of caoutchouc, gutta-percha, balata, reclaimed rubber, synthetic rubber, rubber isomers and like products, whether or not admixed with vulcanizing agents, pigments, fillers, etc., or previously purified, concentrated, vulcanized or otherwise treated.

Inasmuch as numerous modifications of the above described process may be practiced without departing from the spirit and scope of this invention, it is not intended to limit the invention except as may be required by the prior art and as indicated in the appended claims.

I claim:

1. The method which comprises treating latex with an activated adsorbent agent.

2. The method which comprises treating latex with an adsorbent agent selected from the class comprising silica gel, activated aluminia and activated carbon.

3. The method of reducing the alkalinity of latex which comprises treating latex with silica gel.

4. The method of reducing the alkalinity of latex which comprises agitating the latex together with silica gel and subsequently removing the silica gel.

5. The method of reducing the alkalinity of latex which comprises treating ammonia-preserved latex with silica gel.

6. The method of reducing the alkalinity of latex which comprises treating ammonia-preserved natural latex with silica gel.

7. The method of reducing the alkalinity of latex which comprises agitating ammonia-preserved natural latex in the presence of silica gel and subsequently removing the silica gel.

In witness whereof I have hereunto set my hand this 6th day of March, 1929.

HENRY C. HOWARD.